(12) United States Patent
Gross

(10) Patent No.: US 7,762,560 B2
(45) Date of Patent: Jul. 27, 2010

(54) CLAMPING CHUCK

(75) Inventor: Johann Gross, Hellbronn (DE)

(73) Assignee: Schunk GmbH & Co. KG Spann- und Greiftechnik, Lauffen (DE)

( * ) Notice: Subject to any disclaimer, the term of this patent is extended or adjusted under 35 U.S.C. 154(b) by 1001 days.

(21) Appl. No.: 11/512,268

(22) Filed: Aug. 30, 2006

(65) Prior Publication Data
US 2007/0075506 A1    Apr. 5, 2007

(30) Foreign Application Priority Data
Aug. 31, 2005    (DE)    .................. 10 2005 041 518

(51) Int. Cl.
B23B 31/14    (2006.01)
B23B 31/16    (2006.01)
B23B 31/177    (2006.01)

(52) U.S. Cl. .................... 279/121; 279/110; 279/130

(58) Field of Classification Search ................ 279/110, 279/121, 130; B23B 31/14, 31/177, 31/16
See application file for complete search history.

(56) References Cited

U.S. PATENT DOCUMENTS

| 4,097,053 | A | * | 6/1978 | Steinberger | ................. | 279/130 |
| 4,240,645 | A | * | 12/1980 | Rohm | .................. | 279/130 |
| 4,275,892 | A | * | 6/1981 | Rohm | .................. | 279/130 |
| 4,422,655 | A | | 12/1983 | Waite | | |
| 4,504,070 | A | * | 3/1985 | Norton | .................. | 279/130 |
| 4,572,524 | A | * | 2/1986 | Hiestand | ................. | 279/130 |
| 5,060,957 | A | | 10/1991 | Stolzenberg et al. | | |
| 5,340,130 | A | * | 8/1994 | Gorse | ................. | 279/110 |
| 5,522,607 | A | * | 6/1996 | Chen | .................. | 279/121 |
| 5,842,703 | A | | 12/1998 | Antoni | | |
| 6,017,266 | A | * | 1/2000 | Tabachenko | ................. | 451/385 |
| 6,343,797 | B1 | * | 2/2002 | Tajnafoi et al. | ............. | 279/130 |
| 6,425,584 | B1 | * | 7/2002 | Stickney | ................. | 279/119 |
| 6,454,278 | B1 | * | 9/2002 | Wrobel et al. | ............. | 279/130 |

FOREIGN PATENT DOCUMENTS

| DE | 38 22 506 C1 | 7/1989 |
| DE | 102 41 826 B3 | 3/2004 |
| EP | 0 865 853 A | 9/1998 |
| EP | 0 865 853 A1 | 9/1998 |

\* cited by examiner

*Primary Examiner*—Eric A Gates
(74) *Attorney, Agent, or Firm*—Berenato & White, LLC

(57) ABSTRACT

A clamping chuck has a chuck body and clamping jaws that are shiftable in radial jaw guides. Conveying elements are radially guided in the chuck body. Lubricant is pumped into lubricating orifices, and through them to lubrication points by radial motion of the conveying elements. Each pocket has at least one pump piston in a cylinder bore of the conveying element, and is held in the pocket in so that the conveying element moves relative to the pump piston. The pump piston protrudes through the conveying element and into the radially outer region of the pocket. The tubular end portion is connected to the piston space. A first nonreturn valve is provided in the pump piston. The piston space is connected to a lubricating orifice of the chuck body, and a second nonreturn valve allows lubricant flow from the piston chamber to the lubricant conduit.

18 Claims, 6 Drawing Sheets

CLAMPING CHUCK

CROSS-REFERENCE TO RELATED APPLICATIONS AND CLAIM TO PRIORITY

This application is related to patent application number 041 518.0-14, filed Aug. 31, 2006, in the Federal Republic of Germany, the disclosure of which is incorporated by reference and to which priority is claimed.

FIELD OF THE INVENTION

The present invention relates to a clamping chuck, having a chuck body and clamping jaws that are arranged shiftably in radial jaw guides of the chuck body, pockets in which conveying elements are guided in radially movable fashion being embodied in the chuck body, and means being provided for pumping lubricant that collects in the pockets into lubricating orifices, and through the latter to desired lubrication points, by way of the radial motion of the conveying elements.

BACKGROUND OF THE INVENTION

Clamping chucks of this kind are known, for example, from DE 38 22 506 C1, and in practice are used chiefly to clamp workpieces onto lathes for machining. Conventional clamping chucks are embodied in the manner of a three-jaw chuck, and possess three clamping jaws that are arranged in corresponding radial jaw guides of the chuck body. Guidance of the clamping jaws in the jaw guides is accomplished via corresponding guide grooves and guide rails that are embodied on the lateral surfaces of the clamping jaws and of the jaw guides.

One problem that often occurs in conventional clamping chucks is that with increasing circumferential velocity, large centrifugal forces occur which cause the inherently preloaded clamping jaws to be pulled outward, thus resulting in a decrease in clamping force. For this reason, in the clamping chuck previously known from DE 38 22 506 C1, a centrifugal force compensation is effected by way of centrifugal force compensation weights that are each arranged shiftably below an associated clamping jaw in the chuck body, and are connected to the clamping jaw via a clamping lever that is braced in pivotably movable fashion in the chuck body and rests with its one end in a guide recess of the compensation weight, and with its second end in a guide recess of the clamping jaw. Upon the occurrence of centrifugal forces, the clamping lever is pulled outward by the compensation weight and simultaneously transfers a force counteracting the centrifugal force of the compensation weight to the clamping jaw, which consequently is retightened.

In the known clamping chuck, the radial motions that the centrifugal force compensation weights execute upon a shifting of the clamping jaws are furthermore used to pump lubricating grease, which is displaced out of the jaw guides during operation by the resulting centrifugal forces and collects in the pockets of the centrifugal force compensation weights, back into the region of the jaw guides. Embodied for this purpose on the underside of the centrifugal force compensation weights, in the levers, and in the clamping jaws are lubricant conduits through which the lubricant that collects in the radially outer region of the pockets is pushed into the region of the sliding surfaces between the clamping jaws and the chuck piston when the centrifugal force compensation weights are shifted radially outward upon a radially inward shifting of the clamping jaws and the radially outer region of the pockets thus becomes smaller.

A disadvantage of this known approach is that the pumping action resulting from the motion of the centrifugal force compensation weights is not sufficient if the pockets are only partly filled with lubricating grease; and the risk also exists that some of the lubricant contained in the lubricant conduits will be aspirated back into the pocket in the context of an inwardly-directed motion of the centrifugal force compensation weights.

SUMMARY OF THE INVENTION

It is therefore the object of the invention to embody a clamping chuck of the kind cited initially so as to ensure reliable conveyance of lubricant out of the pockets into the region of the guides that are to be lubricated.

This object is achieved, according to the present invention, in that there is provided in each pocket at least one pump piston that is arranged in a cylinder bore of the conveying element that is movable in the pocket, forming a piston space located therebetween, and is held in the pocket in such a way that the conveying element, in the context of its radial motions, moves relative to the pump piston while making the piston space smaller and larger; that the pump piston protrudes, with a radially outer, tubular end portion, through the conveying element and projects into the radially outer region of the pocket, the tubular end portion being connected via a connecting conduit to the piston space; that a first nonreturn valve, which permits a fluid flow from the pocket through the tubular end portion and the connecting conduit into the piston space but blocks a lubricant flow in the opposite direction, is provided in the pump piston; and that the piston space is connected to a lubricating orifice of the chuck body through an outlet conduit embodied in the conveying element, and a second nonreturn valve is provided which allows a lubricant flow from the piston chamber to the lubricant conduit but prevents a backflow of lubricant in the opposite direction.

The invention is thus based on the idea of providing a pump system in order to assist the conveyance of lubricant out of the pockets to the sliding surfaces that are to be lubricated, which conveyance is brought about primarily by the displacement effect of the conveying element moving outward in the pocket. The pump system is constituted substantially by a pump piston that, in particular, is held in fixed fashion on the radially inner pocket wall and engages into the cylinder bore of the conveying element to form a piston space. When the conveying element is moved radially outward, this radial motion takes place relative to the stationary pump piston, so that the piston space becomes larger and a negative pressure is correspondingly established in it, with the consequence that lubricant is aspirated out of the pocket through the tubular end portion of the pump piston and into the piston space. The second nonreturn valve prevents lubricant or air from also being aspirated out of the lubricating orifices of the chuck body. When the conveying element is moved radially inward, this causes the piston space to become smaller, with the result that the lubricant present therein is pushed into the lubricating orifices and through them to the sliding surfaces that are to be lubricated. The first nonreturn valve prevents a backflow of lubricant into the pocket as it becomes larger. The result is that satisfactory lubrication is ensured even when the pockets are not completely filled with lubricant.

A further advantage is that the position of the aspiration opening of the tubular end portion of the pump piston is independent of the position of the conveying element in the pocket. Because the pump piston does not move, the inlet end of the pump piston can extend as far as the outer wall of the pocket, i.e. into a region in which sufficient lubricant is still present even if the pocket is only partially filled.

If the conveying elements are mounted in the pockets in freely radially shiftable fashion, they are automatically pressed outward by the centrifugal forces that occur. In this case return devices are provided, for example in the form of return springs, in order to bring them back into an initial position when the chuck is not being rotated.

In a manner known per se, the conveying elements can also be centrifugal force compensation weights that are coupled to the clamping jaws via levers.

According to an embodiment of the invention, provision is made for the pump piston to be pressed against the radially inner wall of the pocket by a helical compression spring that is arranged in the piston space and is braced between the pump piston and the conveyer. This ensures, in simple fashion, that the pump piston is held against the inner wall of the pocket.

In an embodiment of the invention, the first nonreturn valve that prevents a backflow of lubricant into the pocket can be housed in an axial orifice of the pump piston. In this case the nonreturn valve usefully comprises, as a valve element, a ball that is pressed by a helical spring against a seat.

To ensure that the lubricant being conveyed travels into the lubricating orifice of the chuck body regardless of the position of the inwardly moving conveying element, according to a further embodiment provision is made for the outlet conduit to open into a radial transfer groove that is embodied on the upper side of the centrifugal force compensation weight and/or on the surface, coming into contact therewith, of the chuck body. The outlet conduit can connect tangentially to the piston space, and extend in particular in the axial direction of the chuck.

According to a preferred embodiment of the invention, provision is made for two pump pistons to be arranged in each pocket, symmetrically with respect to the center axis of the conveying element. This configuration has the advantage that imbalances are avoided, and moreover that in the case in which the conveying elements are embodied as centrifugal force compensation weights, the pump systems do not collide with the lever by way of which the centrifugal force compensation weight is coupled to the associated clamping jaw. It is moreover possible, by way of the two pump systems, to supply lubricant to two corresponding sliding surfaces concurrently with one another.

In a manner known per se, the pockets can be in communication with one another via a peripheral annular conduit, thus ensuring an identical fill level in all the pockets. Usefully, lubricant reservoir orifices, which extend in the axial direction of the chuck and are likewise connected to the pockets via the annular conduit, can also be embodied in the chuck body. In an embodiment of this configuration, the lubricant reservoir orifices have an inclined outer surface on their radially outer region, so that stored lubricant is transported, by the centrifugal force occurring during operation, in the axial direction to the annular conduit and from there into the pockets.

A protective bushing, which is embodied to diverge conically toward the front side of the chuck body, can furthermore be inserted into the central receptacle of the clamping chuck. Cooling water dripping onto this conical surface is conveyed axially forward to the chuck face by way of the gradient resulting from the conicity, in combination with the centrifugal force of the rotary motion. A majority of the dirt particles present in the water can thereby be floated out again toward the front. Seals can furthermore be provided in order to prevent any entry of cooling fluid into the chuck body from the region of the receptacle, and thereby to prevent washouts.

Lastly, radial outlet grooves can be embodied in the jaw guides, through which grooves coolant that penetrates into the gap formed between the clamping jaws and the jaw guides is directed radially out of the chuck body without getting into the region of the mutually engaged guide rails and guide grooves of the clamping jaw and jaw guide, respectively.

BRIEF DESCRIPTION OF THE DRAWINGS

Regarding additional advantageous embodiments of the invention, the reader is referred to the dependent claims and to the description below of an exemplifying embodiment with reference to the appended drawings, in which:

DETAILED DESCRIPTION OF THE PREFERRED EMBODIMENT(S)

Figure 1:
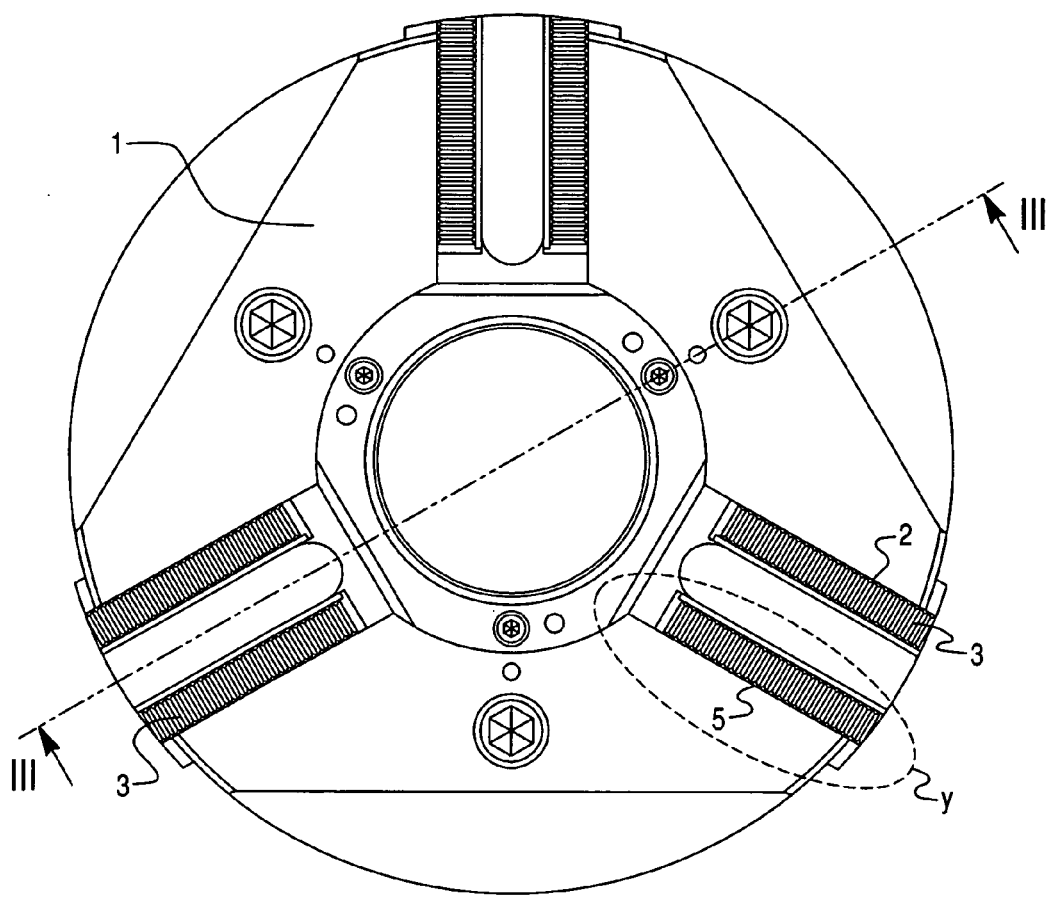
FIG. 1 is a front view of a clamping chuck according to the present invention.
Figure 2:
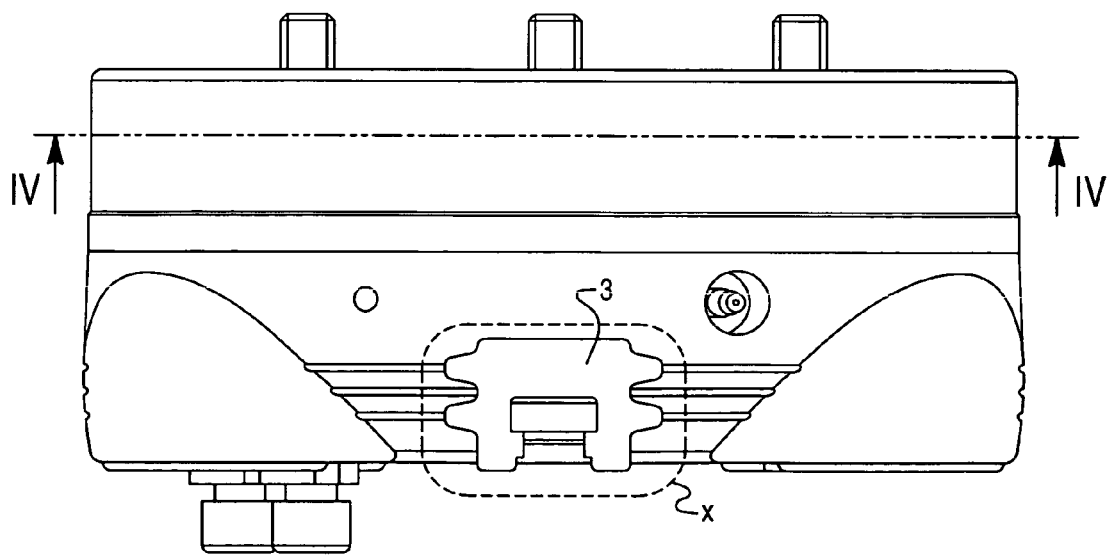
FIG. 2 is a side view of the clamping chuck of FIG. 1.
Figure 3:
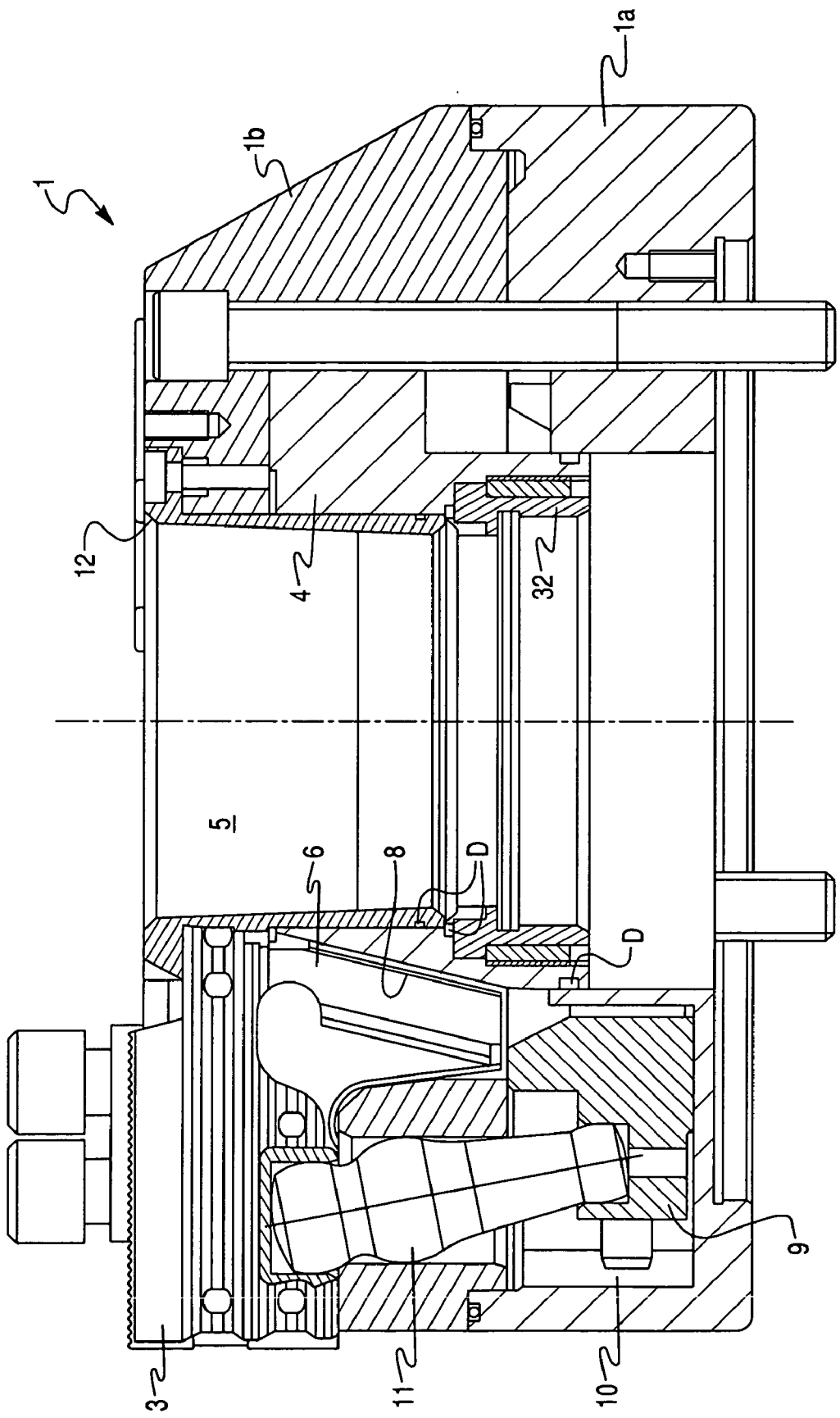
FIG. 3 shows the clamping chuck of FIG. 1 in section along line III-III of FIG. 1.

The Figures depict a powered clamping chuck according to the present invention that can be used, for example, to clamp workpieces on lathes. Part of the clamping chuck is a chuck body 1, which is divided axially into a base body 1a and a cover 1b and possesses a basically cylindrical shape, and which can be bolted onto the spindle (not depicted) of, for example, a lathe. Provided in the one, front end face of chuck body 1 are radial jaw guides 2 that are evenly distributed over the circumference, i.e. arranged at a respective 120° offset from one another. Inserted into jaw guides 2 are clamping jaws 3 that are each made up of a base jaw and an attachable jaw threadable thereonto, only the base jaw being depicted in the drawings. To allow absorption of the forces that occur when clamping workpieces for machining, guide rails 3a, and guide grooves 2a engaged therewith, are embodied respectively on the lateral surfaces of clamping jaws 3 and of jaw guides 2. Concretely, two guide rails 3a of trapezoidal cross section are embodied on each lateral surface of clamping jaws 3, and corresponding guide grooves 2a in jaw guides 2. Radial outlet grooves 2b are furthermore embodied in the region of jaw guides 2 between guide grooves 2a and the front end face of chuck body 1. These outlet grooves serve to direct coolant, which penetrates into the gap formed between clamping jaws 3 and jaw guides 2 from the front end face of chuck body 1, radially out of chuck body 1 without allowing it to get into the region of the mutually engaged guide rails 3a and guide grooves 2a of clamping jaw 3 and jaw guide 2, respectively.

In a manner known per se, a protective bushing 12 is inserted into central receptacle 5 of the clamping chuck. Protective bushing 12 is embodied to diverge conically toward the front side of chuck body 1, so that cooling water dripping onto it is conveyed axially forward to the chuck face by way of the gradient resulting from the conicity, in combination with the centrifugal force of the rotary motion. A majority of the dirt particles present in the water can thereby be floated out again toward the front. Seals D are furthermore provided in order to prevent any entry of cooling fluid into chuck body 1 from the region of the receptacle, and thereby to prevent washouts.

Seals D are furthermore provided between protective bushing 12 and piston 4, between piston 4 and a tension bushing 32 threaded into receptacle 5 from the rear side of the chuck, and between piston 4 and receptacle 5, in order to prevent the penetration of coolant into chuck body 1.

Radial shifting of clamping jaws 3 is accomplished by way of a clamping piston 4 that is axially movable in the central bore or receptacle 5 of chuck body 1 and can be actuated by hydraulic or mechanical drive means. Clamping piston 4 is joined to base jaw 3 via a wedge hook coupling, as is known per se. For that purpose, respective T-shaped wedge hooks 6 are embodied on the radially inwardly facing ends of base jaws 3, and engage into corresponding T-shaped keyways 7 of clamping piston 4. Wedge hooks 6 and keyways 7 comprise wedge surfaces 8 that extend at an acute angle to the axis of the chuck body and coact with one another in such a way that an axial shift of clamping piston 4 is converted into a synchronous radial motion of base jaws 3.

In order to eliminate or decrease the centrifugal forces acting on clamping jaws 3 at high rotation speeds of the clamping chuck, a total of three centrifugal force compensation weights 9 are provided. Each clamping jaw 3 has a compensation weight 9 of this kind associated with it, compensation weight 9 being arranged, in radially shiftable fashion, centeredly behind or below clamping jaw 3 in a pocket 10 of chuck body 1, and being connected to the associated clamping jaw 3 via a lever 11 braced in chuck body 1. The drawing shows that lever 11 engages with a front end into a recess 3b of clamping jaw 3, whereas its rear end is arranged movably in centrifugal force compensation weight 9. When, during operation, radially outwardly directed centrifugal forces act on clamping jaw 3, they are compensated for by corresponding forces that, as a result of the centrifugal forces acting on compensation weights 9, place a load on levers 11 so that the latter in turn place a load on clamping jaws 3 in the centripetal direction. In this fashion, at least a majority of the centrifugal forces acting on clamping jaws 3 can be compensated for.

Figure 5:
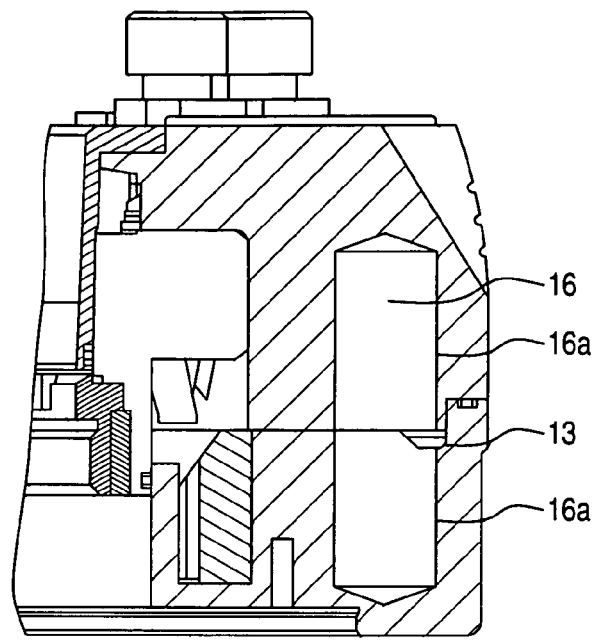
FIG. 5 shows the clamping chuck of FIG. 4 in section along line C-C.

Pockets 10 in chuck body 1 that are provided for centrifugal force compensation weights 9 are connected to one another by way of an annular conduit 13, embodied in chuck body 1, that is embodied here as a peripheral annular groove in the end surface of base body 1a that faces toward cover 1b and is closed off by cover 1b. In chuck body 1, as is particularly clearly evident from FIG. 5, multiple lubricant reservoir orifices 16 are also embodied in base body 1a and in cover 1b, and extend in the axial direction of the chuck; lubricant reservoir orifices 16 have inclined outer surfaces 16a in their radially outer region, so that stored lubricant is transported, by the centrifugal force occurring during operation, in the axial direction to annular conduit 13.

In order to convey, in particular to sliding surfaces 7 between chuck piston 4 and clamping jaws 3, the lubricating grease that is present in pockets 10 and is also pushed into pockets 10 from the radially inwardly located guide surfaces by the resulting centrifugal forces during operation, centrifugal force compensation weights 9 each have two pump systems associated with them. These pump systems each possess a pump piston 17 that is arranged radially shiftably in a radial cylinder bore 18 of centrifugal force compensation weight 9 to form a piston space 19 located therebetween, and is pressed against inner wall 10a of pocket 10 by a helical compression spring 20 that is arranged in piston space 19 and is braced between pump piston 17 and a shoulder 21 of centrifugal force compensation weight 9. Pump piston 17 protrudes, with its radially outer end portion 17b, through centrifugal force compensation weight 9 and, as may be seen particularly clearly from FIG. 4 and FIG. 6, rests against radial outer wall 10b of pocket 10. Pump piston 17 is of tubular configuration, so that end portion 17b projecting into pocket 10 forms an aspiration connector through which lubricant can travel from pocket 10 via connecting conduits 22 into piston space 19. The cylindrical-segment contour of outer wall 10b of pocket 10 ensures that a gap is always present between end portion 17b of pump piston 17 and pocket wall 10b.

Figure 6:
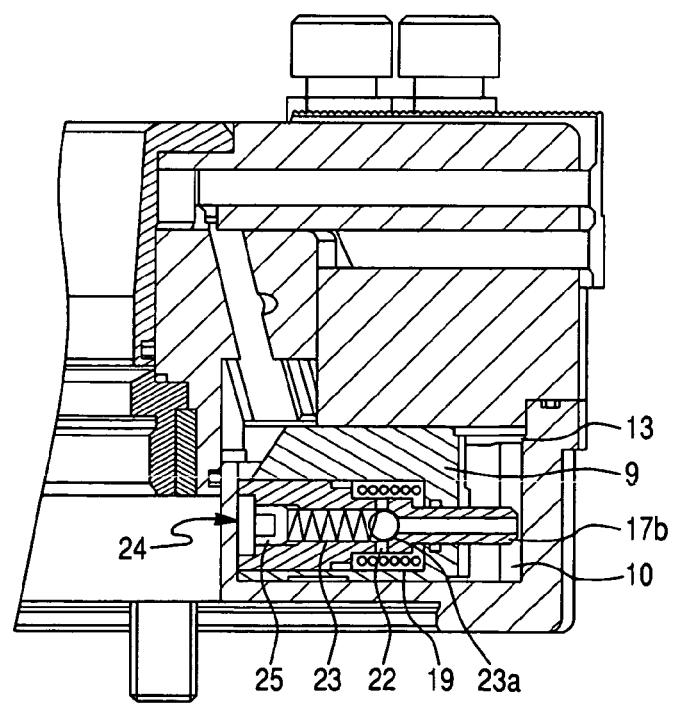
FIG. 6 shows the clamping chuck of FIG. 4 in section along line G-G.

It is clearly evident from FIG. 6 that orifice 23 within pump piston 17 is connected to piston space 19 through two connecting conduits 22 extending radially in pump piston 17; a first nonreturn valve 24, which allows a fluid flow from pocket 10 into piston space 19 but blocks any fluid flow in the opposite direction, is provided in pump piston 17. First nonreturn valve 24 is constituted here by a ball 24a that is pressed by a helical compression spring 24b against a shoulder 23a, embodied as a valve seat, of orifice 23. Helical compression spring 24b is braced at its radially inwardly facing end against a set screw 25 that is threaded into orifice 23.

Figure 4:
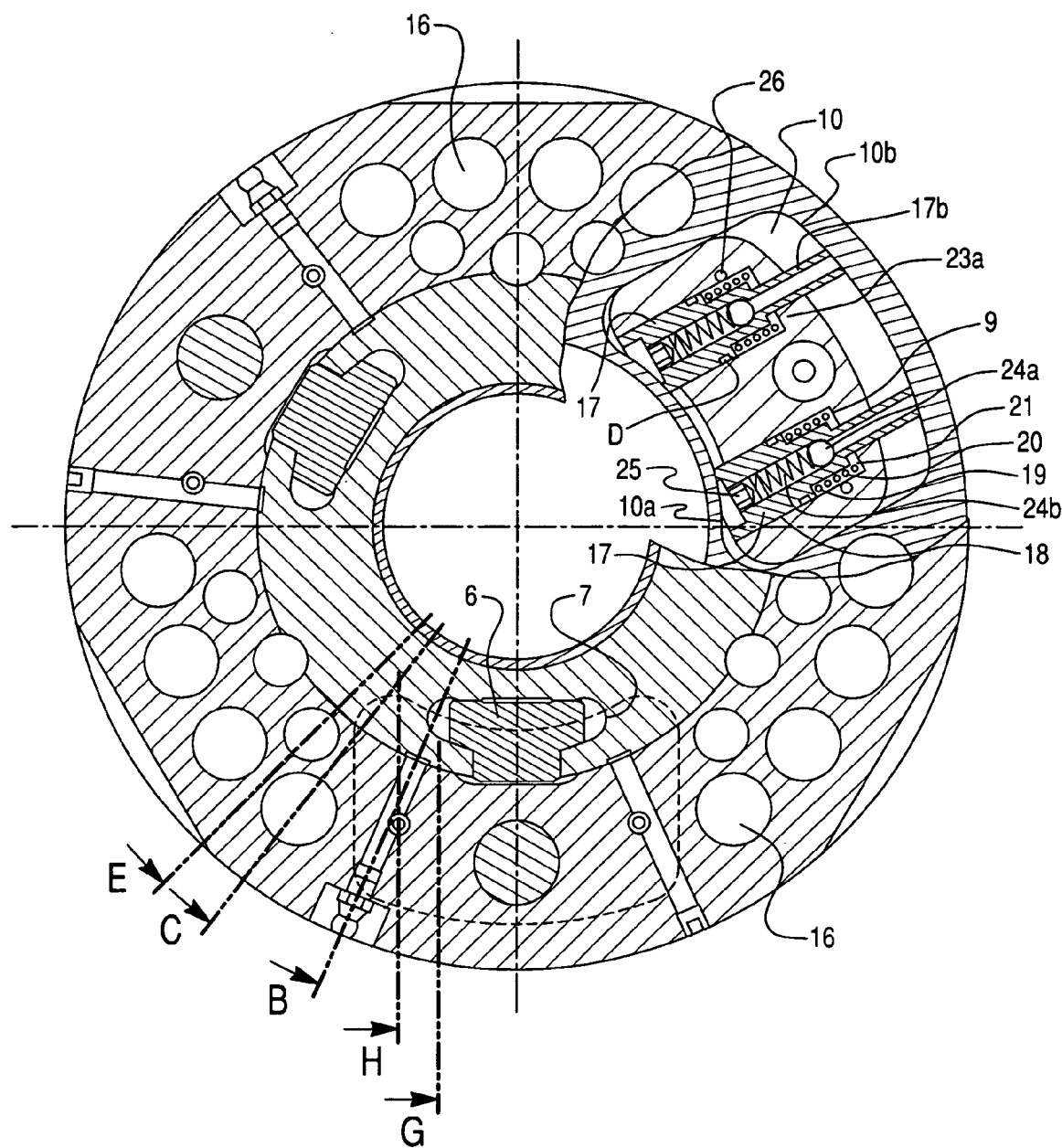
FIG. 4 shows the clamping chuck of FIG. 1 in section along line IV-IV of FIG. 2.
Figure 7:
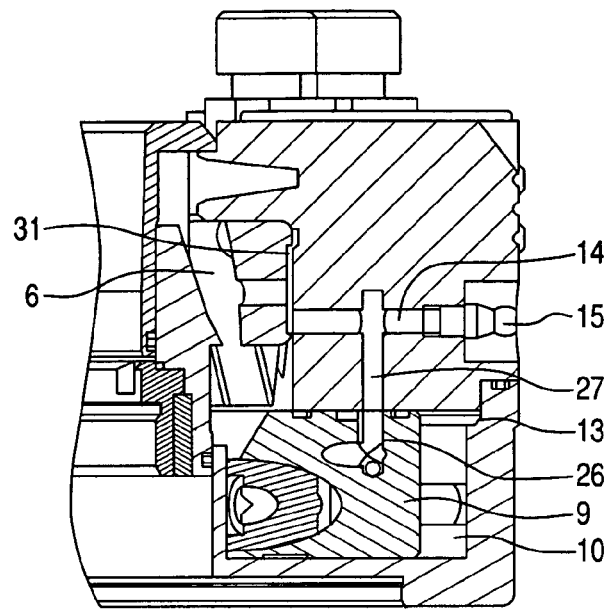
FIG. 7 shows the clamping chuck of FIG. 4 in section along line B-B.
Figure 8:
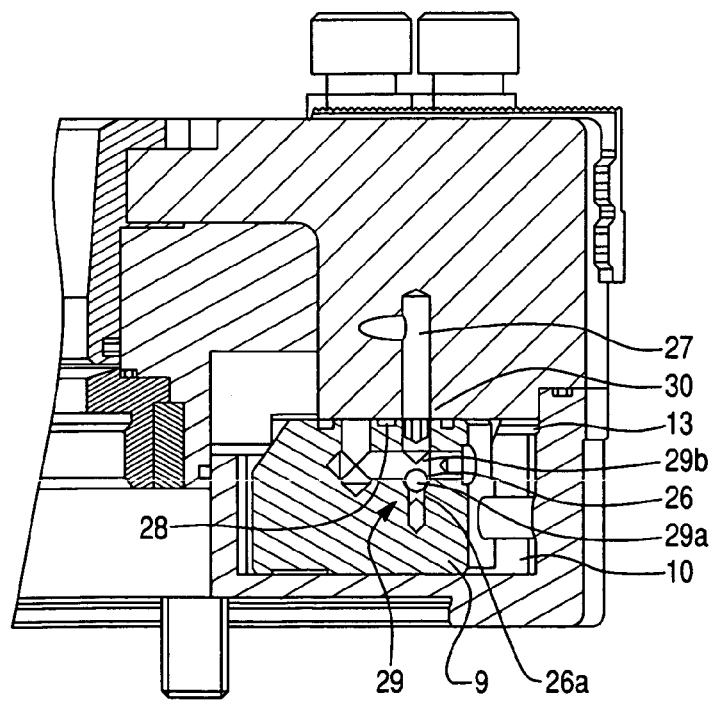
FIG. 8 shows the clamping chuck of FIG. 4 in section along line H-H.
Figure 9:
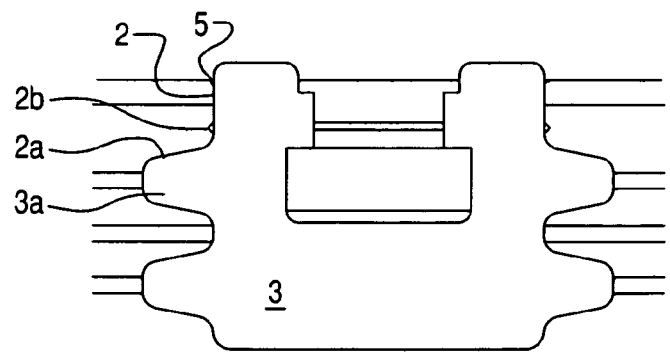
FIG. 9 is an enlarged depiction of area X of FIG. 2.
Figure 10:
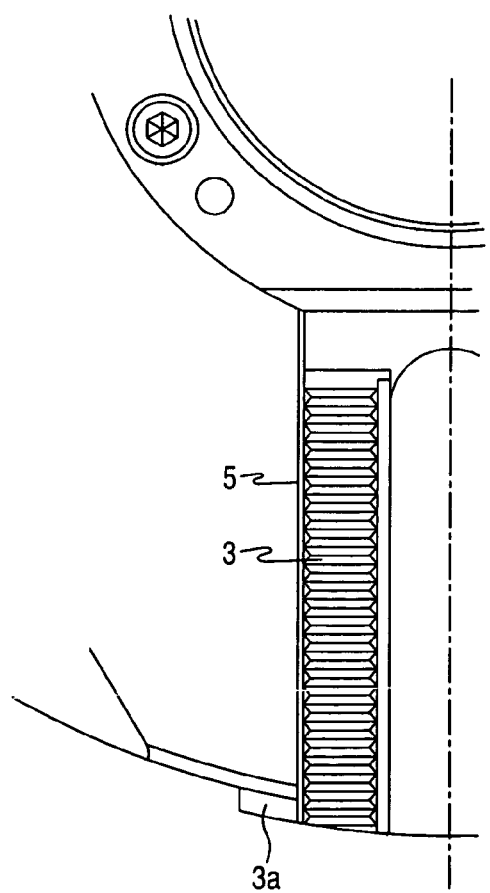
FIG. 10 is an enlarged depiction of area Y of FIG. 1.

FIGS. 4, 7, and 8 in combination clearly depict the fact that piston space 19 is connected, via an outlet conduit 26 that connects tangentially to piston space 19, to a lubricating orifice 27 of chuck body 1. Concretely, outlet conduit 26 opens into a radial transfer groove 28 which is embodied on the upper side of centrifugal force compensation weight 9 in such a way that the vertical lubrication orifice 27 is always in fluid communication with transfer groove 28 regardless of the position of centrifugal force compensation weight 9. A lubricating nipple 15, through which a suitable lubricating grease can be delivered, is connected to lubricating orifice 27 via a supply conduit 14.

Embodied in outlet conduit 26 of centrifugal force compensation weight 9 is a second nonreturn valve 29 that, in the same fashion as first nonreturn valve 24, is constituted by a ball 29a that is pressed by a helical compression spring 29b against a seat 26a, and is braced at its one end against a set screw 30 that is threaded into outlet conduit 26. Second nonreturn valve 29 permits a fluid flow from piston space 19 to transfer groove 28, but prevents any flow in the opposite direction.

Lubricating orifice 27 of chuck body 1 opens into the radial inner region of chuck body 1 in the vicinity of wedge hooks 6 with which clamping jaws 3 are coupled to the power-actuated piston 4. A transfer groove 31, which ensures that lubricating orifice 27 is in communication with transfer groove 31 regardless of the piston position, is provided in piston 4.

When clamping jaws 3 are moved inward, this causes centrifugal force compensation weights 9 to move radially outward in pockets 10. The consequence of this is that the radially outer region of pockets 10 becomes smaller and the lubricating grease present in pockets 10 is pushed out of pockets 10, a portion being pushed into pump piston 17. At the same time, piston spaces 19 become larger when centrifugal force compensation weights 9 are moved outward relative to pump piston 17, with the consequence that a negative pressure is created in piston spaces 19 and lubricant is thus aspirated out of pockets 10. Second nonreturn valves 29 prevent fluid from also being aspirated out of lubricating orifices 27 into piston spaces 19.

When clamping jaws 3 are moved away from one another again at a later time, piston spaces 19 become smaller, with the result that the lubricant present in piston spaces 19 is conveyed via second nonreturn valves 29 to lubricating orifices 27 in chuck body 1 and from there to wedge hooks 6 that are to be lubricated. First nonreturn valves 24 prevent any backflow of lubricant out of piston spaces 19 into pockets 10.

I claim:

1. A clamping chuck, having a chuck body (1) and clamping jaws (3) that are arranged shiftably in radial jaw guides (2) of the chuck body (1), pockets (10) in which conveying elements (9) are guided in radially movable fashion being embodied in the chuck body (1), and means being provided for pumping lubricant that collects in the pockets (10) into lubricating orifices (27), and through the latter to desired lubrication points, by way of the radial motion of the conveying elements (9), wherein there is provided in each pocket (10) at least one pump piston (17) that is arranged in a cylinder bore (18) of the conveying element (9) that is movable in the pocket (10), forming a piston space (19) located therebetween, and is held in the pocket (10) in such a way that the conveying element (9), in the context of its radial motions, moves relative to the pump piston (17) while making the piston space (19) smaller and larger;

the pump piston (17) protrudes, with a radially outer, tubular end portion (17b), through the conveying element (9) and projects into the radially outer region of the pocket (10), the tubular end portion (17b) being connected via a connecting conduit (22) to the piston space (19);

a first nonreturn valve (24), which permits a fluid flow from the pocket (10) through the tubular end portion (17b) and the connecting conduit (22) into the piston space (19) but blocks a lubricant flow in the opposite direction, is provided in the pump piston (17); and the piston space (19) is connected to a lubricating orifice (27) of the chuck body (1) through an outlet conduit (26) embodied in the conveying element (9), and a second nonreturn valve (29) is provided which allows a lubricant flow from the piston chamber (19) to the lubricant conduit (27) but prevents a backflow of lubricant in the opposite direction.

2. The clamping chuck according to claim 1, wherein the radially outer end of the tubular end portion (17b) rests against the outer wall (10b) of the pocket (10).

3. The clamping chuck according to claim 1, wherein the first nonreturn valve (24) that prevents a backflow of lubricant into the pocket (10) is housed in an axial orifice (23) of the pump piston (17).

4. The clamping chuck according to claim 3, wherein the first nonreturn valve (24) comprises, as a valve element, a ball (24a) that is pressed by a helical compression spring (24b) against a seat (23a).

5. The clamping chuck according to claim 1, wherein the outlet conduit (26) connects tangentially to the piston space (19).

6. The clamping chuck according to claim 1, wherein the outlet conduit (26) opens into a radial transfer groove (28) that is embodied on the upper side of the conveying element (9) and/or on a surface, coming into contact therewith, of the chuck body (1).

7. The clamping chuck according to claim 1, wherein the second nonreturn valve (29) is embodied in the conveying element (9).

8. The clamping chuck according to claim 1, wherein the lubricating orifice (27) of the chuck body (1) is transported into the radially inner region of the chuck body (1) in the vicinity of wedge hooks (6) by way of which the clamping jaws (3) are coupled to a power-actuated piston (4).

9. The clamping chuck according to claim 1, wherein two pump pistons (17) are arranged in each pocket (10), symmetrically with respect to the center axis of the conveying element (9).

10. The clamping chuck according to claim 1, wherein return devices are provided with which, when the clamping chuck is not rotating, the conveying elements (9) are moved into a radially inner initial position in which they rest, in particular, against the radially inner wall (10a) of the associated pocket (10).

11. The clamping chuck according to claim 1, wherein the pump piston (17) is pressed against the radially inner wall (10b) of the pocket (10) by a helical compression spring (20) that is arranged in the piston space (19) and is braced between the pump piston (17) and the conveying element (9).

12. The clamping chuck according to claim 1, wherein the conveying elements (9) are embodied as centrifugal force compensation weights that are each coupled to a clamping jaw (3) via a lever.

13. The clamping chuck according to claim 1, wherein the pockets (10) are in communication with one another via a peripheral annular conduit (13).

14. The clamping chuck according to claim 13, wherein lubricant reservoir orifices (16), which extend in the axial direction of the chuck and are connected to the pockets (10) via the annular conduit (13), are embodied in the chuck body (1).

15. The clamping chuck according to claim 14, wherein the lubricant reservoir orifices (16) have inclined outer surfaces (16a) in their radially outer region, so that lubricant stored in them is transported, by the centrifugal force occurring during operation, in the axial direction to the annular conduit (13).

16. The clamping chuck according to claim 1, wherein a protective bushing (12) is inserted into the central receptacle of the clamping chuck (1), and the protective bushing (12) is embodied to diverge conically toward the front side of the chuck body (1).

17. The clamping chuck according to claim 16, wherein seals (D) are provided in order to prevent any entry of cooling fluid into the chuck body (1) from the region of the receptacle.

18. The clamping chuck according to claim 1, wherein radial outlet grooves (2b) are embodied in the jaw guides (2), through which grooves coolant that penetrates into the gap formed between the clamping jaws (3) and the jaw guides (2) is directed radially out of the chuck body (1) without getting into the region of the mutually engaged guide rails (3a) and guide grooves (2a) of the clamping jaws and jaw guides.

* * * * *